US008200039B2

(12) United States Patent
Jin et al.

(10) Patent No.: US 8,200,039 B2
(45) Date of Patent: Jun. 12, 2012

(54) LAYING OUT MULTIPLE IMAGES

(75) Inventors: Hailin Jin, Campbell, CA (US); Jen-Chan Chien, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1277 days.

(21) Appl. No.: 11/697,284

(22) Filed: Apr. 5, 2007

(65) Prior Publication Data

US 2008/0247667 A1   Oct. 9, 2008

(51) Int. Cl.
    G06K 9/36   (2006.01)
(52) U.S. Cl. ........ 382/284; 382/276; 382/287; 382/289; 382/294; 382/295
(58) Field of Classification Search .................. 382/284, 382/276–277, 287, 289, 294–298
    See application file for complete search history.

(56) References Cited

U.S. PATENT DOCUMENTS

| | | | | |
|---|---|---|---|---|
| 5,646,679 | A * | 7/1997 | Yano et al. | 348/47 |
| 5,982,951 | A * | 11/1999 | Katayama et al. | 382/284 |
| 5,987,164 | A * | 11/1999 | Szeliski et al. | 382/154 |
| 6,075,905 | A * | 6/2000 | Herman et al. | 382/284 |
| 6,078,701 | A * | 6/2000 | Hsu et al. | 382/294 |
| 6,173,087 | B1 * | 1/2001 | Kumar et al. | 382/284 |
| 6,249,616 | B1 * | 6/2001 | Hashimoto | 382/284 |
| 6,434,265 | B1 * | 8/2002 | Xiong et al. | 382/154 |
| 7,095,905 | B1 * | 8/2006 | Peterson | 382/284 |
| 7,317,558 | B2 * | 1/2008 | Chiba | 358/450 |
| 2002/0041717 | A1 * | 4/2002 | Murata et al. | 382/275 |
| 2003/0048938 | A1 * | 3/2003 | Wang et al. | 382/132 |
| 2003/0076406 | A1 * | 4/2003 | Peleg et al. | 348/36 |
| 2003/0142882 | A1 * | 7/2003 | Beged-Dov et al. | 382/284 |
| 2004/0057633 | A1 * | 3/2004 | Mai et al. | 382/284 |
| 2008/0247667 | A1 * | 10/2008 | Jin et al. | 382/284 |
| 2010/0103311 | A1 * | 4/2010 | Makii | 348/369 |

OTHER PUBLICATIONS

Can, A. et al. "A Feature-Based Technique for Joint, Linear Estimation of High-Order Image-to Mosaic Transformations: Mosaicing the Curved Human Retina", 2002, IEEE Transactions on Pattern Analysis and Machine Intelligence, vol. 24, No. 3, p. 412-419.*

Mann, S. et al. "Video Orbits of the Projective Group: A New Perspective on Image Mosaicing", 1995, MIT Media Laboratory Perceptual Computing Section Technical Report No. 338, p. 1-17.*

Brown, M.; Lowe, D.G.;, "Recognising panoramas", Proceedings. Ninth IEEE International Conference on Computer Vision, 2003. p. 1-8.*

Marzotto, R.; Fusiello, A.; Murino, V.;, "High resolution video mosaicing with global alignment", Proceedings of the 2004 IEEE Computer Society Conference on Computer Vision and Pattern Recognition, 2004. CVPR 2004, p. 1-7.*

Kim, D.; Hong, K.; "Real-time mosaic using sequential graph", 2006, Journal of Electronic Imaging 15(2), p. 1-13.*

* cited by examiner

*Primary Examiner* — Jason M Repko
*Assistant Examiner* — Gandhi Thirugnanam
(74) *Attorney, Agent, or Firm* — Fish & Richardson P.C.

(57) ABSTRACT

Systems, methods, and apparatuses, including computer program products, are provided for re-layout of composite images. In some implementations, a method includes identifying geometric transformations corresponding to multiple images from a collection of images, where a geometric transformation reorients a corresponding image in relation to a common reference frame when applied and identifying a reference image for the multiple images in the collection of images. The method also includes determining overlapping image regions for the multiple images starting from the reference image, the determining based on the identified geometric transformations, determining additional transformations of a specified type for the multiple images based on the overlapping image regions, where an additional transformation lays out a corresponding image in relation to the reference image when applied, and making the additional transformations available for further processing and output with respect to the collection of images.

51 Claims, 7 Drawing Sheets

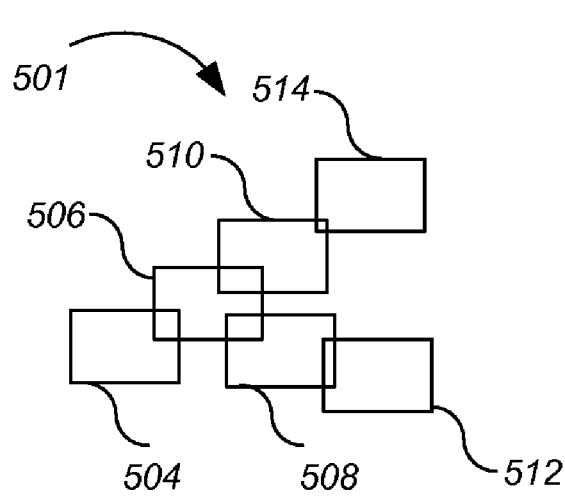 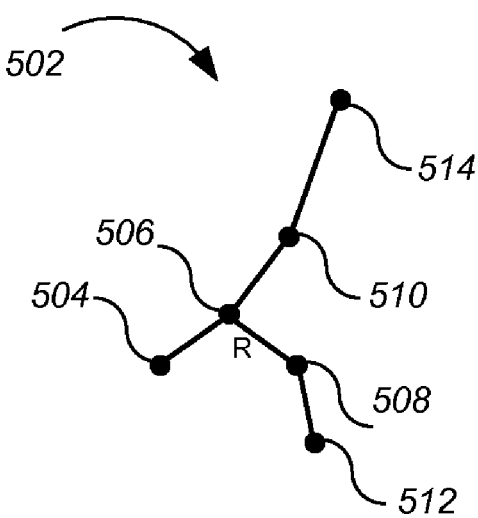
*FIG. 5A*  *FIG. 5B*
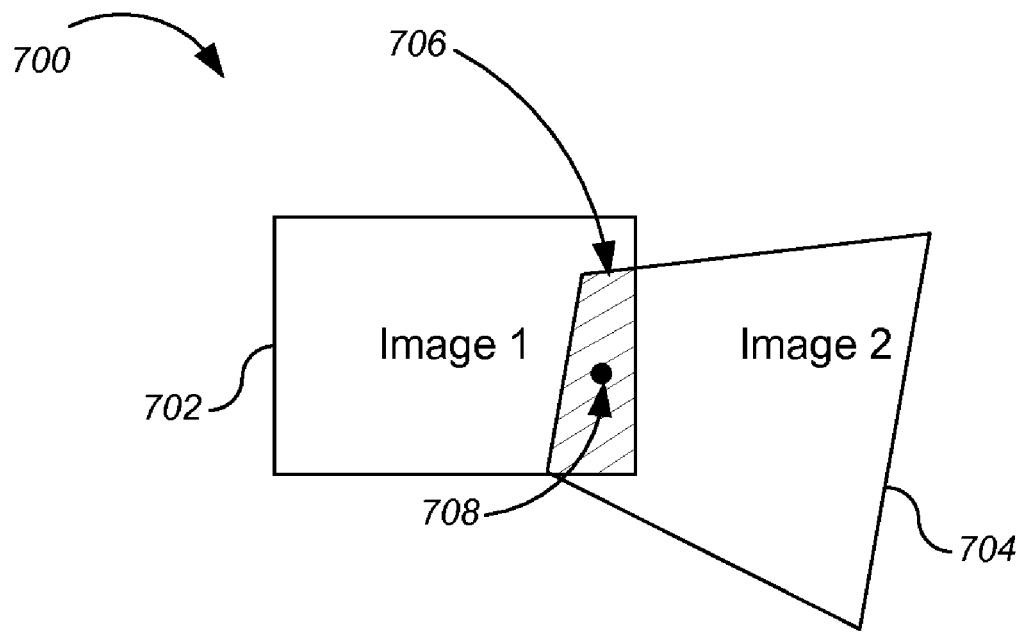
*FIG. 7*

LAYING OUT MULTIPLE IMAGES

BACKGROUND

The present disclosure relates to forming composite images.

Image capture devices, e.g., cameras, can be used to capture an image of a section of some larger view, and such image capture devices can have a field of view that is less than desired. Thus, to generate an image of the larger view, multiple overlapping images of sections of the view can be taken, and the images can be stitched together to form a composite image, which may sometimes be referred to as a panoramic image.

An image captured by an input device often distorts the image. For example, an image captured by a camera distorts the sizes of objects depicted in the image so that distant objects appear smaller than closer objects. In particular, capturing an image results in a projection of the section of the view. This projection can vary depending on the viewpoint of the image capture device, which results in projective distortion between the captured images.

Different image stitching software tools are available, including commercial products and free software available, for example, over the Web. These image stitching software tools include tools that require user input to establish a reference image for a set of images, tools that automatically select a reference image based on a fixed ordering to the images (i.e., the first image in the set can be taken as the reference image), and tools that automatically select a reference frame, which is not locked to any specific image. Recently, automatic image stitching, i.e., image stitching with no user interaction, has become feasible and popular, thanks to advances in computer vision techniques. Given a set of images, there is software that can return a set of transformations that, when applied to the images, allows the images to be joined together in a composite image in a seamless, or nearly seamless manner.

One example transformation is a projective transformation. A projective transformation is generally a nonlinear, two dimensional transformation that is conservative in terms of cross-ratios. A projective transformation can be represented with a 3×3 real non-singular matrix:

$$P = \begin{bmatrix} p_{11} & p_{12} & p_{13} \\ p_{21} & p_{22} & p_{23} \\ p_{31} & p_{32} & p_{33} \end{bmatrix}.$$

Given a point with coordinates $x=[x_1,x_2]$, the transformed coordinates are given by:

$$y = [y_1, y_2] = \left[\frac{(p_{11}x_1 + p_{12}x_2 + p_{13})}{(p_{31}x_1 + p_{32}x_2 + p_{33})}, \frac{(p_{21}x_1 + p_{22}x_2 + p_{23})}{(p_{31}x_1 + p_{32}x_2 + p_{33})}\right].$$

The identity transformation can be represented with the 3×3 identity matrix:

$$P = \begin{bmatrix} 1 & 0 & 0 \\ 0 & 1 & 0 \\ 0 & 0 & 1 \end{bmatrix}.$$

and is a special projective transformation that, when applied to an image, results in the same image.

SUMMARY

Systems, methods, and apparatuses, including computer program products, are provided for laying out images. In general, in one aspect, a method is provided. The method includes identifying geometric transformations corresponding to multiple images from a collection of images, where a geometric transformation reorients a corresponding image in relation to a common reference frame when applied and identifying a reference image for the multiple images in the collection of images. The method also includes determining overlapping image regions for the multiple images starting from the reference image, the determining based on the identified geometric transformations, determining additional transformations of a specified type for the multiple images based on the overlapping image regions, where an additional transformation lays out a corresponding image in relation to the reference image when applied, and making the additional transformations available for further processing and output with respect to the collection of images. Other embodiments of this aspect include corresponding systems, apparatus, and computer program products.

Implementations of the aspect can include one or more of the following features. Determining overlapping image regions for the multiple images can further include identifying a relative transformation for a second image relative to a first image of the multiple images using the identified geometric transformations corresponding to the first image and the second image and identifying the overlapping image region of the first image and the second image when the relative transformation is applied to the second image. The first image can be the reference image and the second image is an image of the multiple images having a shortest distance to the reference image. The distance from the reference image to the second image can be determined using a connectivity graph relating overlapping images of the multiple images.

The additional transformations can be two-dimensional (2D) translations and determining the 2D translation for the second image includes determining an incremental 2D translation relative to a translation of the first image. Identifying the relative transformation can includes determining a projective transformation between the first image and the second image using the corresponding geometric transformations. Determining the projective transformation includes converting the corresponding geometric transformations into first projective transformations relating the first image and the second image to the common reference frame. The geometric transformations can be projective transformations, cylindrical transformations, or spherical transformations.

The additional transformations can be 2D translations and determining the 2D translations for the multiple images based on the overlapping image regions includes identifying center points for each of the overlapping image regions. Identifying the center point of an overlapping image region can include identifying coordinates for a plurality of vertices of the overlapping region, and calculating a mean of the coordinates for the plurality of vertices. The aspect can further include identifying a center image of the multiple images and using the center image as the reference image.

The additional transformations can be 2D translation and rotation transformations, and where determining the translation and rotation for one or more of the multiple images can include using two or more points in the determined overlapping regions. The additional transformations can be 2D translation, rotation and scaling transformations and where determining the translation, rotation and scaling for one or more images of the multiple images can include using two or more points in the determined overlapping regions. The type of additional transformations can be user specified. Identifying the reference image can include identifying an image corresponding to the common reference frame. The aspect can further include displaying a composite layout for the multiple images after applying the additional transformations.

Particular embodiments of the subject matter described in this specification can be implemented to realize one or more of the following advantages. Multiple images can be repositioned to an aligned layout where the images are offset from their original positions without introducing unwanted distortions to the images. Initial positions for the multiple images can be identified using geometric transformations. The geometric transformations can be used to reposition the images according to a specified transformation including, for example, a two dimensional translation, a translation combined with a rotation, and a translation, rotation, and scaling combination.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 5A is a block diagram illustrating overlapping images.

FIG. 5B is an example connectivity graph corresponding to the group of overlapping images shown in FIG. 5A.

FIG. 7 is an example block diagram representing overlapping images.

Like reference numbers and designations in the various drawings indicate like elements.

DETAILED DESCRIPTION

Figure 1:
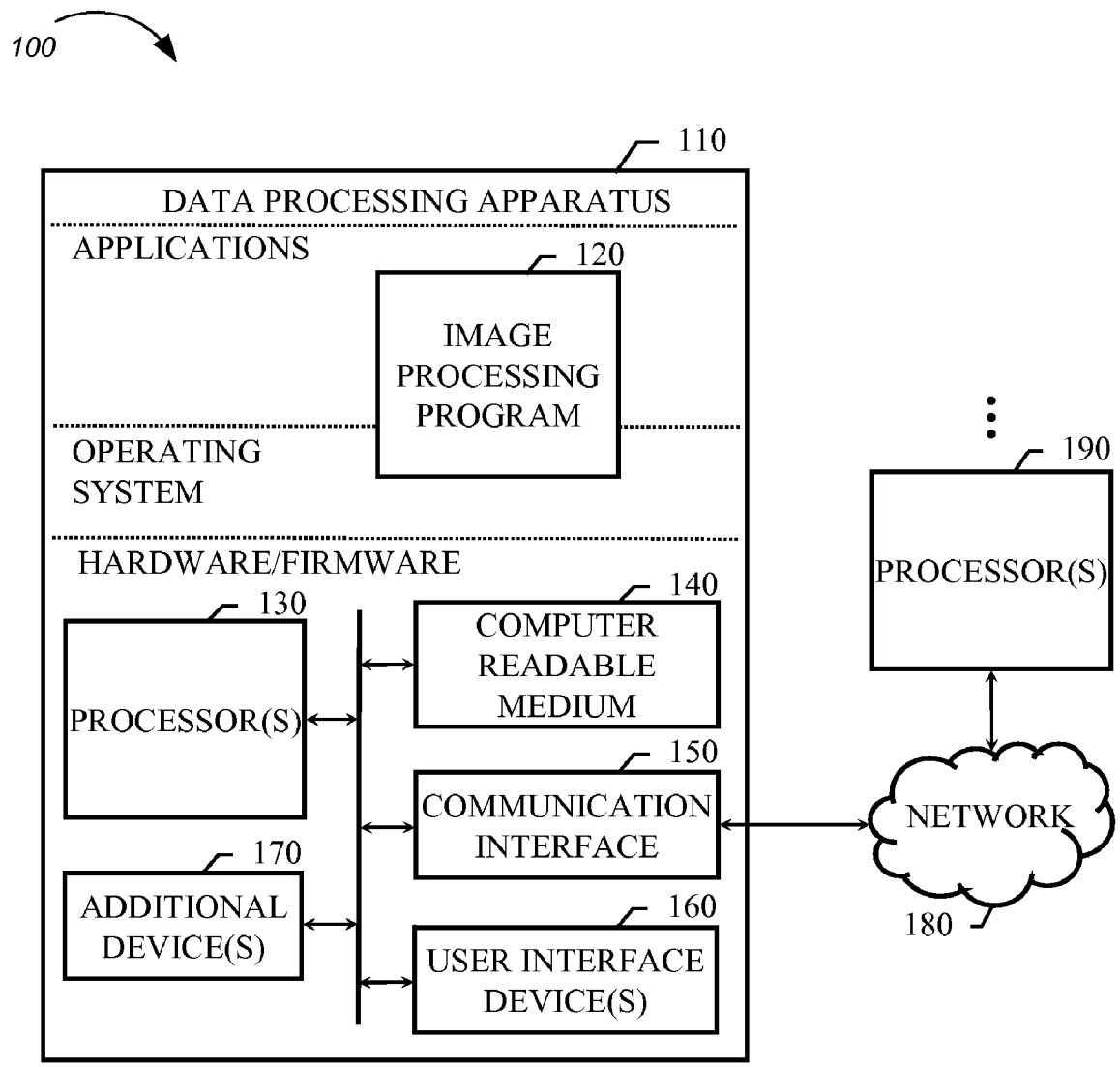
FIG. 1 is a block diagram illustrating an example system for laying out images.

FIG. 1 is a block diagram illustrating an example system 100 for laying out images. A data processing apparatus 10 can include hardware/firmware, an operating system and one or more programs, including image processing program 120. The image processing program 120 operates, in conjunction with the data processing apparatus 110, to effect various operations described in this specification. Thus, the program 120, in combination with processor(s) and computer-readable media (e.g., memory), represents one or more structural components in the system.

The image processing program 120 can be an image processing application (e.g., an image alignment or image stitching application), or a portion thereof. As used herein, an application refers to a computer program that the user perceives as a distinct computer tool used for a defined purpose. An application can be built entirely into the operating system (OS) of the data processing apparatus 110, or an application can have different components located in different locations (e.g., one portion in the OS or kernel mode, one portion in the user mode, and one portion in a remote server), and an application can be built on a runtime library serving as a software platform of the apparatus 110. Moreover, an application can be a graphical user interface application (e.g., a Web browser) that connects to one or more processors 190 (e.g., one or more Web servers) over a network 180 and provides the computer tool as a network service.

The image processing program 120 can include visual effects software (e.g., Adobe® After Effects® software, available from Adobe Systems Incorporated of San Jose, Calif.), image editing software (e.g., Adobe® Photoshop® software, available from Adobe Systems Incorporated of San Jose, Calif.), and video editing software (e.g., Adobe® Premiere® software, available from Adobe Systems Incorporated of San Jose, Calif.). Thus, the image processing program 120 can operate on digital images from many different sources. Moreover, a digital image (which for brevity will simply be referred to as an image) does not necessarily correspond to a file. An image may be stored in a portion of a file that holds other images, in a single file dedicated to the image in question, or in multiple coordinated files.

The data processing apparatus 110 includes one or more processors 130 and at least one computer-readable medium 140 (e.g., random access memory, storage device, etc.). The data processing apparatus 110 can also include a communication interface 150, one or more user interface devices 160, and one or more additional devices 170. The user interface device(s) 160 can include display screen(s), keyboard(s) (e.g., a custom video editing keyboard), mouse, stylus, or any combination thereof. Moreover, the data processing apparatus 110 can itself be considered a user interface device (e.g., when the image processing program 120 is delivered as a Web service).

The additional device(s) 170 can include various devices used for video and film editing. This can include a video controller coupled to a video recorder (which can be used for storing and importing video footage and for writing final output), a sound system, and a battery backup. Moreover, the subject matter described in this specification can be used in conjunction with any digital print engine or marking engine, display monitor, or other raster output device capable of producing color or gray scale pixels on paper, film, display screen, or other output medium.

Once programmed, the data processing apparatus 110 is operable to identify a specified transformation to layout (e.g., reposition, rotate, and/or scale) multiple images without introducing unnecessary image distortions. In this process, geometric transformations are identified for initially aligning multiple images to a common reference frame. A reference image is identified and the multiple images are repositioned relative to the reference image according to a specified transformation using the identified geometric transformations.

Figure 2:
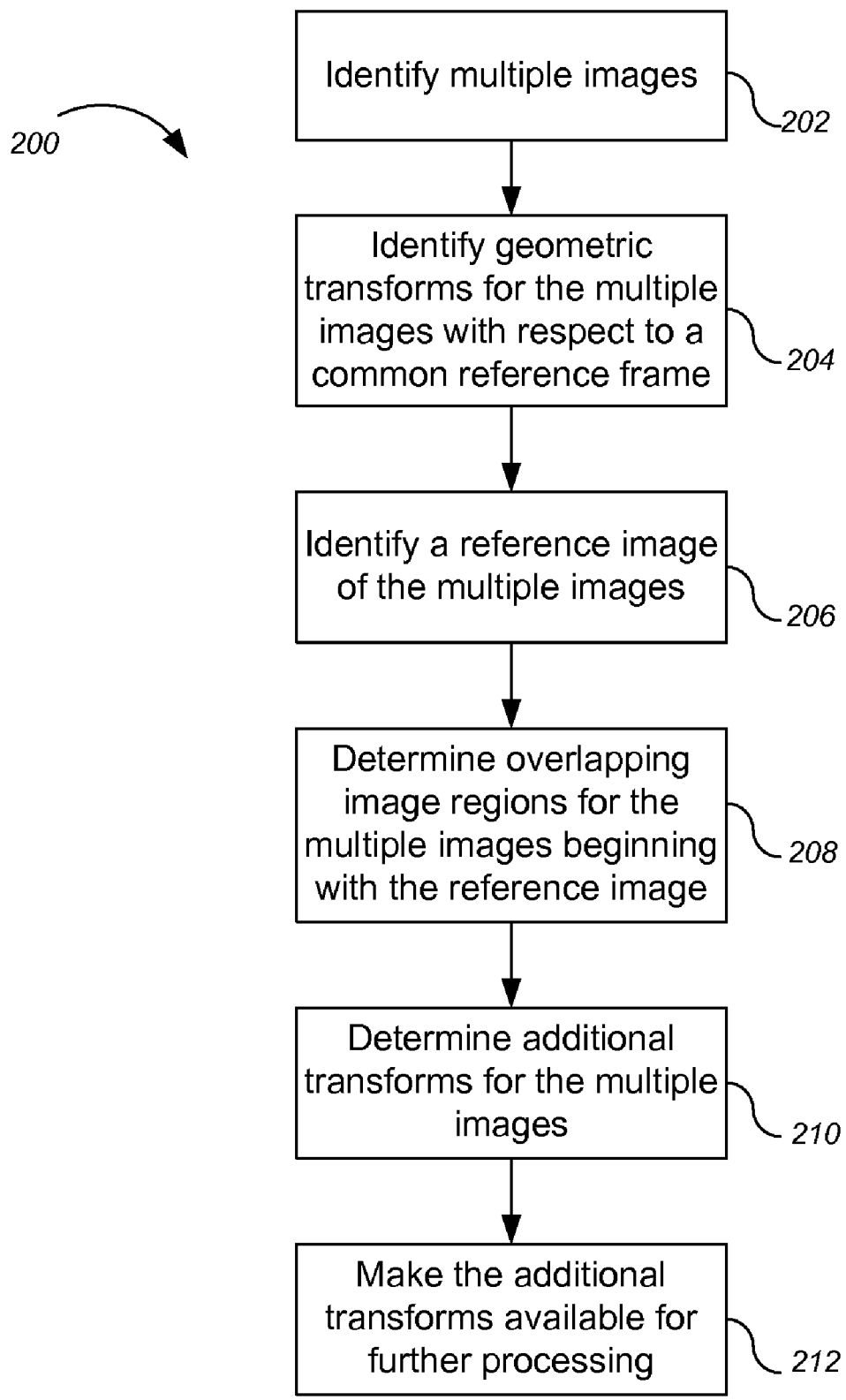
FIG. 2 is a flowchart illustrating an example method for laying out multiple images.

FIG. 2 is a flowchart illustrating an example method 200 for laying out multiple images. For convenience the method 200 will be described with reference to a system that performs the method 200 (e.g., system 100). The system identifies 202 multiple images. The system can identify multiple images for assembly into a composite image. In some implementations, images of the multiple images represent a section of a view generated using an image capture device. For example, a camera rotating about one or more axes can generate the multiple images. In another example, the images can be scanned image sections of a single large image. The images of the multiple images are overlapping images. An overlapping image is an image that at least partially overlaps, or is overlapped by, another image of the multiple images.

Identifying the multiple images can include receiving a group of separate images including the multiple images. For example, the images can be retrieved from a storage device, either locally or remotely, and the overlapping images can be identified automatically using appropriate image stitching techniques. Additionally, the images can be retrieved in response to a user identification of images. In some implementations, the images include additional information, for example, camera parameters associated with the image (e.g., focal length, camera angles).

Figure 3:
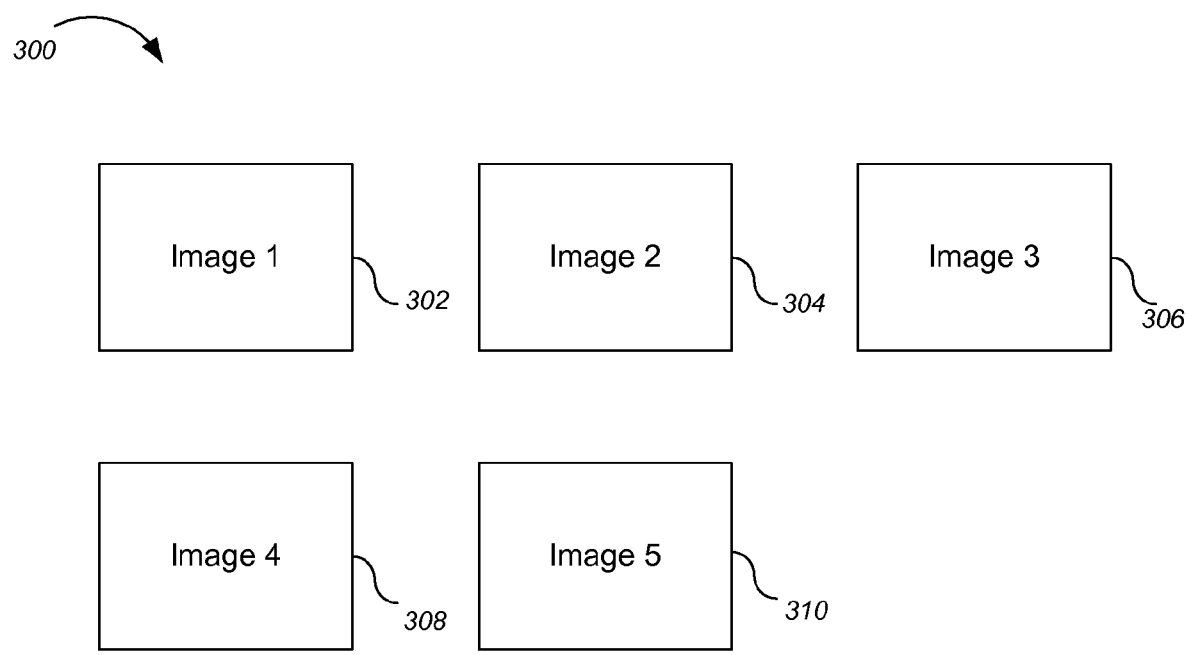
FIG. 3 is a block diagram illustrating multiple images to lay out.

FIG. 3 is a block diagram illustrating multiple images 300 to lay out. The multiple images 300 include images 302, 304, 306, 308, and 310. For example, each image can represent a section of a panoramic view i.e., when combined the images form a panoramic image. The images 302, 304, 306, 308, and 310 are not aligned and therefore need to be positioned relative to the other images when forming the panoramic image. Information about each image, e.g., camera properties, can be used to determine the position of each image relative to each other image.

As shown in FIG. 2, the system identifies 204 geometric transformations for the multiple images with respect to a common reference frame. The geometric transformations are identified for particular images that transform the images into the common reference frame. In some implementations, the common reference frame corresponds to a reference frame of one or more images of the multiple images. When the common reference frame corresponds to an image, the image has a geometric transformation as an identify transformation.

The geometric transformations can be received, for example, from a particular image alignment or image stitching tool. Alternatively, the geometric transformations can be generated using known techniques. For example, the multiple images can be stitched together using feature based image stitching or intensity based image stitching techniques.

In other implementations, the common reference frame is a reference frame distinct from a reference frame of the images of the multiple images (e.g., a particular plane behind the multiple images, or a plane of any of the images). In some implementations, an image stitching application processes each image of the multiple images in turn to identify the geometric transformations that transforms the particular image to the common reference frame. The particular geometric transformation for an image can depend on the image parameters e.g., camera parameters.

In some implementations, the geometric transformations are projective transformations. Projective transformations provide a transformation of the image to a projected image on the common reference frame. Projective transformations project the images while preserving incidence and cross-ratios.

Figure 4:
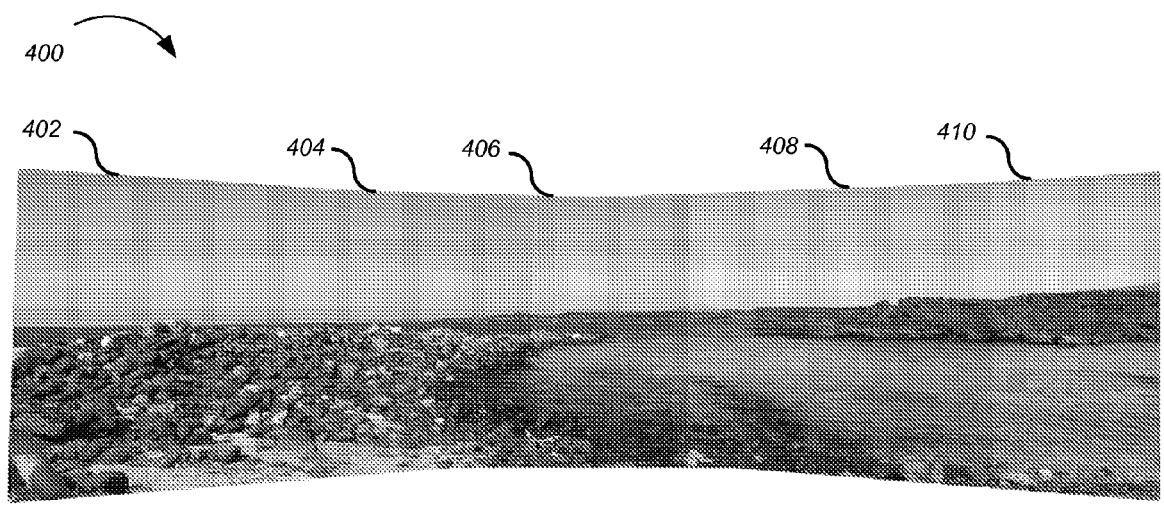
FIG. 4 is an example aligned image illustrating a layout of multiple images aligned using a projective transformation.

FIG. 4 is an example aligned image 400 illustrating multiple images aligned using a projective transform. Aligned image 400, includes five images 402, 404, 406, 408, and 410, which have been projected to a common reference frame according to projective transformations. The images at the edges (i.e., images 402 and 410) have a greater amount of distortion due to the selected common reference frame. For example, if the common reference frame corresponds to the reference frame of the central image 406, then the projective transformation for each other image projects the respective images to the reference frame of image 406. For images generated by rotating an image capture device about an axis, the images rotated further from the center image have a greater difference from their reference frame to the reference frame of the center image. Therefore, a greater distortion results from projecting these images to the reference frame of the center image. However, the images 402-410 are generally aligned with each other such that the relationship between the images is identified.

Another geometric transformation that can be applied to the multiple images is a cylindrical transform. For the cylindrical transform, the common reference frame is the interior surface of a specified cylinder. The cylindrical transformation of an image provides a transformation of the image from the reference frame of the image to a projected image on the surface of the cylinder. Similarly, the geometric transformation applied to the multiple images can be a spherical transformation, in which case, the common reference frame is the interior surface of a specified sphere. The spherical transformation of an image provides a transformation of the image form the reference frame of the image to a projected image on the surface of the sphere. Other geometric transformations can be applied to the multiple images.

As shown in FIG. 2, the system identifies 206 a reference image of the multiple images. In some implementations, the reference image is specified by a user. For example a user can select an image as the reference image (e.g., the center image). In some implementations, the reference image is a center of projection for the multiple images, for example, a center image for a cylindrical projection where all other images are either spatially to the left or the right of the center of projection.

The reference image can also be identified using a connectivity graph. The connectivity graph can be provided by the image alignment or image stitching tool. The connectivity graph identifies relationships between images of the multiple images. In the connectivity graph, images are represented as individual nodes. Edges linking nodes together represent overlapping images. In some implementations, the distance between linked nodes is fixed (e.g., immediately overlapping images have a specified distance between each other of 1.0). In other implementations, the distance between overlapping images (i.e., the length of the edge between two nodes) varies with an estimated distortion between the images. The relative distance between two connected images can be stored as the edge weight, which can be specified for one or more edges in the connectivity graph.

The distortion is a measure of the relative transformation between the two images. The relative transformation is the transformation needed to transform one image into the reference frame of the other image. The greater the transformation, the greater the distortion.

One example technique for determining the distance between two images is to compute the distance as:

$$Distance_{ij} = \log(Distance(i,j))$$

where Distance(i, j) is the sum of the distortion for image j (when image i is set as the reference image) and the distortion for image i (when image j is set as the reference image).

In general, the maximal distance to overlapping images (i.e., images that can be reached through a series of immediately overlapping images), for a given image being selected as the reference image, is the largest distance measured from the given image to all other images in the set. An image having a minimum maximal distance is an image whose maximal distance to each other image of the multiple images is the smallest relative to each other image of the multiple images. The image having the minimum maximal distance can be identified as the reference image for the multiple images.

The image having the minimum maximal distance can be determined using the connectivity graph. A center node of the connectivity graph can be identified. The center node corresponds to the image of the multiple images with the minimum maximal distance to the overlapping images of the multiple images. The connectivity graph can be processed to find all-pairs shortest paths (e.g., with Johnson's algorithm or the Floyd-Warshall algorithm). Using the all-pairs shortest paths, the maximal distance for each image to all other images can be computed. The image having the minimum maximal distance can then be selected as the reference image for the multiple images. If more than one image has the same minimum maximal distance, any of these images can be used as the reference image; if desired, further calculations of estimated distortion can be carried out in such case to distinguish between the multiple images having the same minimum maximal distance.

Other approaches are also possible here for finding the center node, such as finding the node with the minimum average distance to all other nodes. In general, the image with the most connections to other images is often a preferred reference image. In some implementations, an optimal reference image can be identified according to a determination of a minimized overall distortion for the multiple images in light of a selected measure of distortion.

Additional description regarding determining distances between images and identifying an optimal reference image is found in U.S. Pat. No. 7,995,861, which is incorporated by reference.

FIG. 5A is a block diagram illustrating a group overlapping images 501. The group of overlapping images 501 includes images 504, 506, 508, 510, 512, and 514. Each of the images in the group of overlapping images 501 overlaps with one or more other images. For example, image 504 overlaps image 506 only. However, image 506 overlaps three images, 504, 508, and 510. Additionally, the degree of overlap varies between the images. For example, the overlap of images 510 and 514 is very small, while the overlap of images 506 and 508 is more substantial. When weighting the distance between overlapping images according to the distortion, there is a greater distance between images 510 and 514 than between images 504 and 506 since there is less distortion between images 510 and 514.

FIG. 5B is an example connectivity graph 502 corresponding to the group of overlapping images 501 shown in FIG. 5A. The images 504, 506, 508, 510, and 512 are represented by corresponding nodes in the connectivity graph 502. The length of the edges between the nodes represents the distance between the overlapping images. For example, the length of the edge connecting nodes 510 and 514 is long to represent the large amount of distortion between images 510 and 514. In contrast, the edge joining nodes 506 and 508 is short to represent the small amount of distortion between images 506 and 508.

Additionally, FIG. 5B shows that image 506 is the identified reference image, R. The reference image can be identified using the connectivity graph 502 according to one of the techniques described above. For example, the node 506 can have the minimum maximal distance to each other node in the connectivity graph 502.

As shown in FIG. 2, the system determines 208 overlapping image regions for the multiple images beginning with the reference image. The system identifies an overlap between pairs of images of the multiple images.

Figure 6:
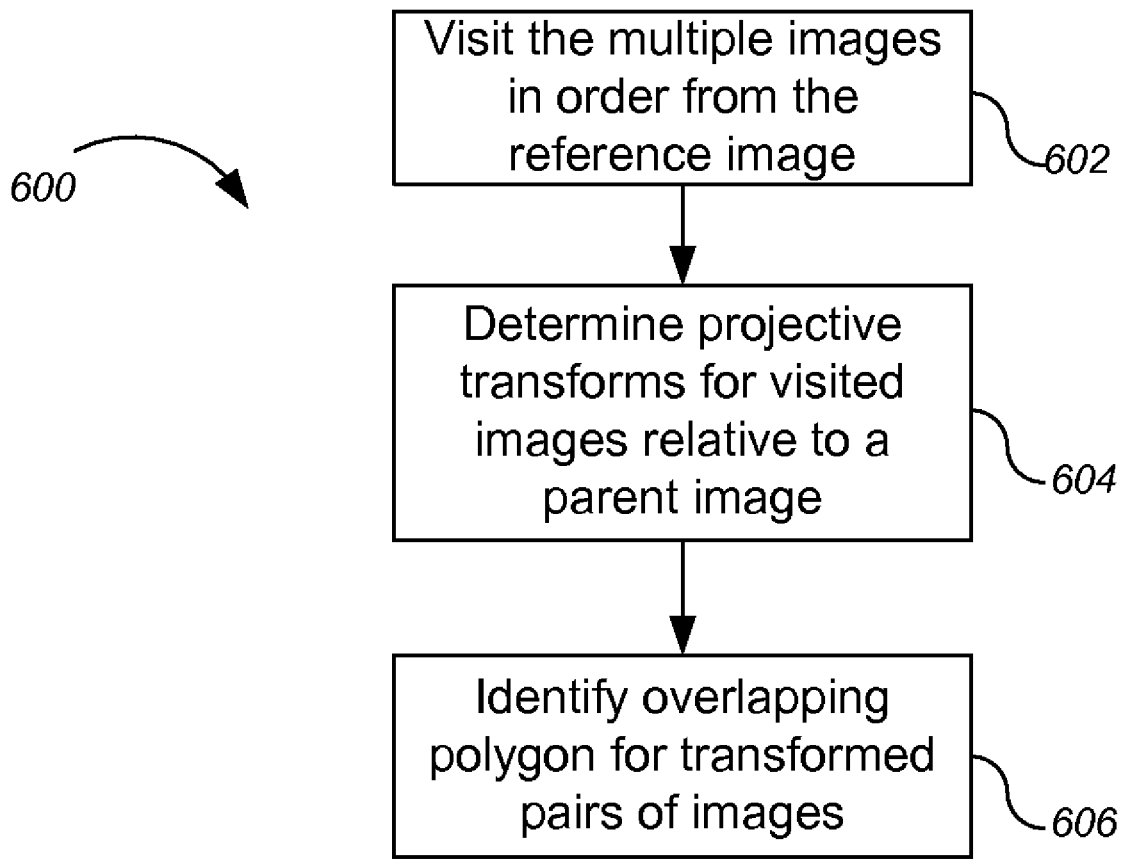
FIG. 6 is a flowchart illustrating an example method of determining overlapping image regions for the multiple images using the connectivity graph.

FIG. 6 is a flowchart illustrating an example method 600 of determining overlapping image regions for the multiple images e.g., using the connectivity graph. For convenience the method 600 will be described with reference to a system that performs the method 600 (e.g., system 100).

The system visits 602 the multiple images in order from the reference image. The order of the multiple images is determined, for example, using the connectivity graph. The order can be determined according to distance from the reference image to each image represented by the connectivity graph. For example, the next visited image following the reference image is the image corresponding to the node that is the shortest distance (can be weighted or un-weighted distance) from the center node. Subsequent images are visited in order of increasing distance from the reference image according to the path along the edges connecting nodes in the connectivity graph.

In some implementations, the visitation order is determined using a shortest path algorithm, for example, the Dijkstra algorithm. The Dijkstra algorithm identifies a shortest path in a directed graph including weighted edges. In particular, the Dijkstra algorithm identifies a cost associated with the paths from the reference node to each other node. The order of nodes from the reference node is determined according to increasing cost.

The system determines 604 a projective transformation for child images relative to parent images. The parent image is an image that overlaps a child image that is further from the reference image than the parent image. For example, the first image in the visitation order from the reference image has the reference image as its parent. Thus, the system determines a projective transformation for the first image relative to the reference image. The projective transformation projects the first image to the reference frame of the reference image.

Similarly, if a second image in the visitation order has the first image as a parent, the system determines a projective transformation for the second image relative to the first image. Thus, except for the reference image, each of the multiple overlapping images has a parent image. The system determines a projective transformation for each parent-child image pair of the multiple images.

Determining the projective transformation for an image relative to a parent image depends on the type of the geometric transformations identified for the multiple images. Determining the projective transformation for the image relative to the parent image is a function of the geometric transformations. If the geometric transformations were first projective transformations, then for a parent image j and a child image i, the projective transformation of image i relative to image j, $dH_{ji}$, is provided by:

$$dH_{ji} = (H_j)^{-1} H_i$$

where $(H_j)^{-1}$ is the inverse of the first projective transformation from the reference frame of image j to the common reference frame and $H_i$ is the first projective transformation from the reference frame of image i to the common reference frame.

However, if the geometric transformations were transformations other than first projective transformations, the geometric transformations are further processed to determine the projective transformation relating the pair of images. In particular, for a parent image j and a child image i, where the geometric transformations are either cylindrical or spherical transformations, the projective transformation of image i relative to image j, $dH_{ji}$, is provided by:

$$dH_{ji} = K_j (R_j)^{-1} R_i (K_i)^{-1}.$$

$R_i$ is a camera rotation from the reference frame of image i to the common reference frame, and $K_i$ is a camera calibration matrix for image i:

$$K_i = \begin{bmatrix} f_i & 0 & c_{i(0)} \\ 0 & f_i & c_{i(1)} \\ 0 & 0 & 1 \end{bmatrix}$$

Where $f_i$ is the focal length for image i and $C_{i0}$ and $C_{i1}$ represent coordinates for the center point of image i. Similarly, $R_j$ is a camera rotation (e.g., a rotation matrix) from the reference frame of image j to the common reference frame, and Kj is the camera calibration matrix for image j:

$$K_j = \begin{bmatrix} f_j & 0 & c_{j(0)} \\ 0 & f_j & c_{j(1)} \\ 0 & 0 & 1 \end{bmatrix}$$

The system identifies 606 an overlapping polygon for transformed pairs of images. The projective transformation projects the child image to the reference frame of the parent image such that an overlapping region can be determined. In some implementations, a bounding box for each image parent-child pair of images is identified using the projective transform. For example, the bounding box for image i and image j can each be convex quadrilaterals defining the outline of the respective images. The intersection of the two bounding boxes for image i and image j provides a polygon (e.g., a convex polygon) of image i representing the overlapping region between the two images.

FIG. 7 is an example block diagram representing a pair 700 of overlapping images. The pair 700 includes a first image represented by a bounding box 702 and a second image represented by a bounding box 704. For example, the first image can be the parent image and the second image can be the child image. By projecting the second image relative to the first image, the overlapping between the images is identified. The intersection of the two bounding boxes 702 and 704 identifies an overlapping region 706.

As shown in FIG. 2, the system determines 210 additional transformations of a specified type for the multiple images. The system determines the additional transformations using the identified overlapping regions for image pairs of the multiple images. In some implementations, the type of additional transformations is user specified. The additional transformations can be used to layout images without introducing additional image distortions. This contrasts with the identified geometric transformations which align images while introducing distortions to the images. The system makes 212 the additional transformations available for further processing. For example, to lay out the images to a final alignment, processing the images to apply additional distortions, and blending the aligned images to form a composite image. Additionally, the layout of the multiple images can be displayed on a display device. A user can select additional processing to apply to the displayed layout. In some implementations, the additional transformations are two-dimensional ("2D") translations. The 2D translations reposition the multiple images in one or more directions in the plane of the common reference frame without otherwise distorting the original images.

In some implementations, the 2D translations are calculated for each image in the visiting order. Thus, the 2D translations for a particular image can be defined relative to the parent image of the particular image. In some implementations, the 2D translations for the reference image are set to zero such that the reference image has no 2D translation. For an image j having a parent image i, the 2D translations for image j are determined using a point in the overlapping region. In some implementations, the center point of the overlapping region is used (e.g., center point 708 in FIG. 7). The center point of the overlapping region can be determined, for example, as the mean of the vertices of the overlapping region, $m_i$, along orthogonal axes. The 2D translation of image j is calculated as:

$$T_j = T_i + m_i - \text{project}((dH_{ji})^{-1}, m_i)$$

Where $T_j$ is the 2D translation of image j, $T_i$ is the 2D translation of image i, $(dH_{ji})^{-1}$ is the inverse of the projective transformation between images i and j, and $m_i$ is the coordinates for the mean of all the vertices of the overlapping region where each vertex has coordinates $(x_1, x_2)$ in the overlapping region. Project$((dH_{ji})^{-1}, m_i)$ is calculated using the matrix:

$$\text{project}(dH, m) = \begin{pmatrix} \dfrac{H_{11}X_1 + H_{12}X_2 + H_{13}}{H_{31}X_1 + H_{32}X_2 + H_{33}} \\ \dfrac{H_{21}X_1 + H_{22}X_2 + H_{23}}{H_{31}X_1 + H_{22}X_2 + H_{33}} \end{pmatrix}$$

Figure 8:
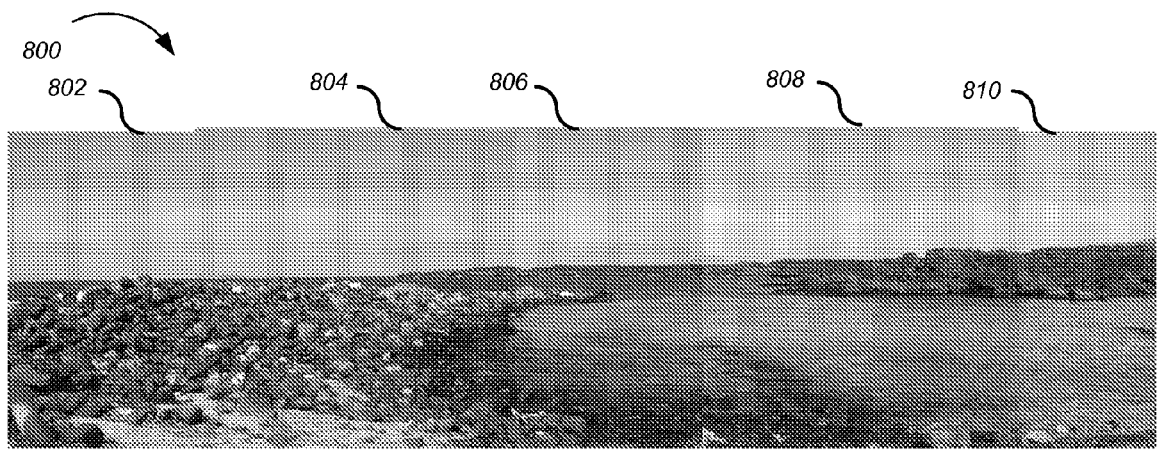
FIG. 8 is an example layout of multiple images.

FIG. 8 is an example layout 800 of multiple images. The layout 800 includes images 802, 804, 806, 808, and 810 corresponding to the images 402, 404, 406, 408, and 410 of FIG. 4. However, images have been laid out relative to each other according to a determined translation amount and without the image distortion resulting from the projective transformations of FIG. 4.

Figure 9:
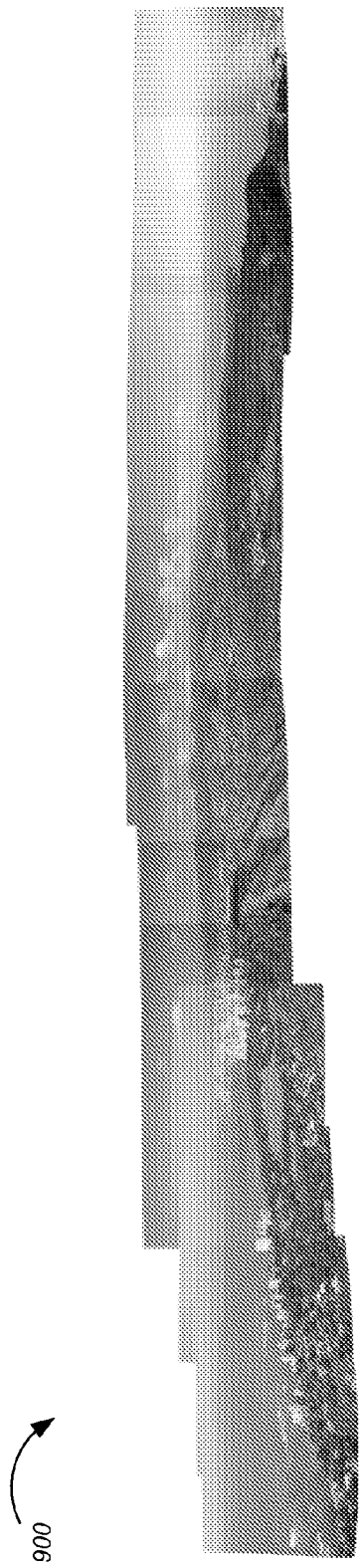
FIG. 9 is an example layout using cylindrical transformations.
Figure 10:
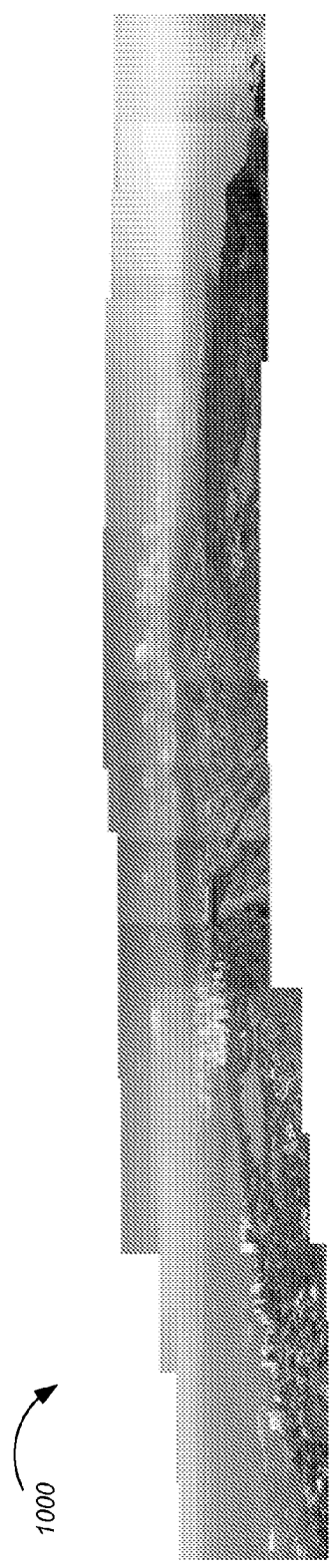
FIG. 10 is an example image layout.

FIGS. 9 and 10 show additional examples of image layout by applying a translation to images. FIG. 9 is an example of a layout 900 using cylindrical transformations as the geometric transformations. In FIG. 9, 17 images are initially positioned according to a particular cylindrical transformation. FIG. 10 is an example image layout 1000. Repositioned image 1000 includes the same 17 images used to form aligned image 900 in FIG. 9. However, images of repositioned image 1000 have been repositioned relative to each other according to a determined 2D translation without the distortion produced by the cylindrical transformations.

In some implementations, the additional transformations combine translation, rotation, and scaling. For example, an image may need to be rotated by some amount in addition to being translated in order to reposition the image. For example, a tilt in the camera between images can result in a rotational change in the image. Similarly, when scanning portions of a single large image, the mechanical scanner can misalign scanned portions such that they cannot be correctly assembled into an aligned composite image without applying a rotation. Additionally, images may need to be scaled due to differences in camera position between images.

As with determining a translation amount only, to determine a translation, rotation, and scaling for images an overlapping region for a pair of images is used. However, in order to calculate both translation and rotation for an image, at least two points in the overlapping region are identified. With two points identified in the overlapping region, the translation, rotation, and scaling amount used to layout an image with a parent image can be calculated in a single operation.

For two vertices in the overlapping region, coordinates $x_1$ and $x_2$ in image i and coordinates $y_1$ and $y_2$ in image j are identified. The coordinates from each image are related to each other according to the following equations:

$$y_1 = dH_{ji} x_1$$

$$y_2 = dH_{ji} x_2$$

To re-layout the image j relative to image i using translation, rotation, and scaling, the system identifies values for s, R, and t such that:

$$y_1 = sRx_1 + t$$

$$y_2 = sRx_2 + t$$

Where s is a scaling value, R is a two-dimensional rotation and t is a two-dimensional translation. Subtracting the equations above provides:

$$sR(x_1 - x_2) = (y_1 - y_2)$$

Consequently, the scaling can be provided as:

$$s = \frac{|y_1 - y_2|}{|x_1 - x_2|}$$

The rotation is defined by a 2×2 rotational matrix:

$$R = \begin{bmatrix} \cos(\theta) & \sin(\theta) \\ -\sin(\theta) & \cos(\theta) \end{bmatrix}$$

where, $$\theta = \arctan2\left(\frac{y_1}{s}, \frac{y_2}{s}\right) - \arctan2(x_1, x_2)$$

Finally, t is computed as:

$$t = \frac{(y_1 + y_2)}{2} - \frac{sR(x_1 + x_2)}{2}$$

In some implementations, the additional transformations combine translations and rotations only. For example, an image may need to be rotated by some amount in addition to being translated in order to reposition the image. For example, a tilt in the camera between images can result in a rotational change in the image. Similarly, when scanning portions of a single large image, the mechanical scanner can misalign scanned portions such that they cannot be correctly assembled into an aligned composite image without applying a rotation. When computing translations and rotation, the same formulas as above can be used by simply ignoring s (e.g., defining s to equal 1).

In some implementations, the additional transformations combine translation, rotation, and scaling. For example, images may need to be scaled due to differences in camera position between images. Again, a similar process as above can be used to identify overlapping regions for pairs of images of the multiple images. However, in order to calculate a translation, rotation, and scaling, at least three points in the overlapping region are identified. With three points identified in the overlapping region, the translation, rotation, and scaling amount used to align an image with a parent image can be calculated in a single operation.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   identifying geometric transformations corresponding to multiple images from a collection of images, where a geometric transformation reorients a corresponding image in relation to a common reference frame when applied;
   identifying a reference image for the multiple images in the collection of images;
   determining overlapping image regions for the multiple images starting from the reference image and proceeding according to an order based on a distance measure between images of the multiple images, the distance measure between a particular pair of images of the multiple images being based on a measure of distortion between the pair of images, the determining based on the identified geometric transformations;
   determining additional transformations of a specified type for the multiple images based on the overlapping image regions, where an additional transformation lays out a corresponding image in relation to the reference image when applied; and
   making the additional transformations available for further processing and output with respect to the collection of images.

2. The method of claim 1, where determining overlapping image regions for the multiple images further comprises:
   identifying a relative transformation for a second image relative to a first image of the multiple images using the identified geometric transformations corresponding to the first image and the second image; and
   identifying the overlapping image region of the first image and the second image when the relative transformation is applied to the second image.

3. The method of claim 2, where the first image is the reference image and the second image is an image of the multiple images having a shortest distance to the reference image.

4. The method of claim 3, where the distance from the reference image to the second image is determined using a connectivity graph relating overlapping images of the multiple images.

5. The method of claim 2, where the additional transformations are two-dimensional (2D) translations and determining the 2D translation for the second image includes determining an incremental 2D translation relative to a translation of the first image.

6. The method of claim 2, where identifying the relative transformation includes determining a projective transformation between the first image and the second image using the corresponding geometric transformations.

7. The method of claim 6, where determining the projective transformation includes converting the corresponding geometric transformations into first projective transformations relating the first image and the second image to the common reference frame.

8. The method of claim 1, where the additional transformations are 2D translations and determining the 2D translations for the multiple images based on the overlapping image regions includes identifying center points for each of the overlapping image regions.

9. The method of claim 8, where identifying the center point of an overlapping image region comprises:
   identifying coordinates for a plurality of vertices of the overlapping region; and
   calculating a mean of the coordinates for the plurality of vertices.

10. The method of claim 1, where the geometric transformations are projective transformations.

11. The method of claim 1, where the geometric transformations are cylindrical transformations or spherical transformations.

12. The method of claim 1, further comprising:
   identifying a center image of the multiple images; and
   using the center image as the reference image.

13. The method of claim 1, where the additional transformations are 2D translation and rotation transformations, and where determining the translation and rotation for one or more of the multiple images includes using two or more points in the determined overlapping regions.

14. The method of claim 1, where the additional transformations are 2D translation, rotation and scaling transformations and where determining the translation, rotation and scaling for one or more images of the multiple images includes using two or more points in the determined overlapping regions.

15. The method of claim 1, where the type of additional transformations is user specified.

16. The method of claim 1, where identifying the reference image comprises identifying an image corresponding to the common reference frame.

17. The method of claim 1, further comprising:
   displaying a composite layout for the multiple images after applying the additional transformations.

18. A computer program product, encoded on a non-transitory computer-readable medium, operable to cause data processing apparatus to perform operations comprising:
   identifying geometric transformations corresponding to multiple images from a collection of images, where a geometric transformation reorients a corresponding image in relation to a common reference frame when applied;
   identifying a reference image for the multiple images in the collection of images;
   determining overlapping image regions for the multiple images starting from the reference image and proceeding according to an order based on a distance measure between images of the multiple images, the distance measure between a particular pair of images of the multiple images being based on a measure of distortion between the pair of images, the determining based on the identified geometric transformations;
   determining additional transformations of a specified type for the multiple images based on the overlapping image regions, where an additional transformation lays out a corresponding image in relation to the reference image when applied; and
   making the additional transformations available for further processing and output with respect to the collection of images.

19. The computer program product of claim 18, where determining overlapping image regions for the multiple images further comprises:
   identifying a relative transformation for a second image relative to a first image of the multiple images using the identified geometric transformations corresponding to the first image and the second image; and
   identifying the overlapping image region of the first image and the second image when the relative transformation is applied to the second image.

20. The computer program product of claim 19, where the first image is the reference image and the second image is an image of the multiple images having a shortest distance to the reference image.

21. The computer program product of claim 20, where the distance from the reference image to the second image is determined using a connectivity graph relating overlapping images of the multiple images.

22. The computer program product of claim 19, where the additional transformations are two-dimensional (2D) translations and determining the 2D translation for the second image includes determining an incremental 2D translation relative to a translation of the first image.

23. The computer program product of claim 19, where identifying the relative transformation includes determining a projective transformation between the first image and the second image using the corresponding geometric transformations.

24. The computer program product of claim 23, where determining the projective transformation includes converting the corresponding geometric transformations into first projective transformations relating the first image and the second image to the common reference frame.

25. The computer program product of claim 18, where the additional transformations are 2D translations and determining the 2D translations for the multiple images based on the overlapping image regions includes identifying center points for each of the overlapping image regions.

26. The computer program product of claim 25, where identifying the center point of an overlapping image region comprises:
   identifying coordinates for a plurality of vertices of the overlapping region; and
   calculating a mean of the coordinates for the plurality of vertices.

27. The computer program product of claim 18, where the geometric transformations are projective transformations.

28. The computer program product of claim 18, where the geometric transformations are cylindrical transformations or spherical transformations.

29. The computer program product of claim 18, further comprising:
   identifying a center image of the multiple images; and
   using the center image as the reference image.

30. The computer program product of claim 18, where the additional transformations are 2D translation and rotation transformations, and where determining the translation and rotation for one or more of the multiple images includes using two or more points in the determined overlapping regions.

31. The computer program product of claim 18, where the specified transformations are 2D translation, rotation and scaling transformations and where determining the translation, rotation and scaling for one or more images of the multiple images includes using two or more points in the determined overlapping regions.

32. The computer program product of claim 18, where the type of additional transformations is user specified.

33. The computer program product of claim 18, where identifying the reference image comprises identifying an image corresponding to the common reference frame.

34. The computer program product of claim 18, further comprising:

displaying a composite layout for the multiple images after applying the additional transformations.

35. A system comprising:
a user input device, a display, a memory device, and a processor programmed to:
identify geometric transformations corresponding to multiple images from a collection of images, where a geometric transformation reorients a corresponding image in relation to a common reference frame when applied;
identify a reference image for the multiple images in the collection of images;
determine overlapping image regions for the multiple images starting from the reference image and proceeding according to an order based on a distance measure between images of the multiple images, the distance measure between a particular pair of images of the multiple images being based on a measure of distortion between the pair of images, the determining based on the identified geometric transformations;
determine additional transformations of a specified type for the multiple images based on the overlapping image regions, where an additional transformation lays out a corresponding image in relation to the reference image when applied; and
make the additional transformations available for further processing and output with respect to the collection of images.

36. The system of claim 35, where determining overlapping image regions for the multiple images further comprises:
identifying a relative transformation for a second image relative to a first image of the multiple images using the identified geometric transformations corresponding to the first image and the second image; and
identifying the overlapping image region of the first image and the second image when the relative transformation is applied to the second image.

37. The system of claim 36, where the first image is the reference image and the second image is an image of the multiple images having a shortest distance to the reference image.

38. The system of claim 37, where the distance from the reference image to the second image is determined using a connectivity graph relating overlapping images of the multiple images.

39. The system of claim 36, where the additional transformations are two-dimensional (2D) translations and determining the 2D translation for the second image includes determining an incremental 2D translation relative to a translation of the first image.

40. The system of claim 36, where identifying the relative transformation includes determining a projective transformation between the first image and the second image using the corresponding geometric transformations.

41. The system of claim 40, where determining the projective transformation includes converting the corresponding geometric transformations into first projective transformations relating the first image and the second image to the common reference frame.

42. The system of claim 35, where the additional transformations are 2D translations and determining the 2D translations for the multiple images based on the overlapping image regions includes identifying center points for each of the overlapping image regions.

43. The system of claim 42, where identifying the center point of an overlapping image region comprises:
identifying coordinates for a plurality of vertices of the overlapping region; and
calculating a mean of the coordinates for the plurality of vertices.

44. The system of claim 35, where the geometric transformations are projective transformations.

45. The system of claim 35, where the geometric transformations are cylindrical transformations or spherical transformations.

46. The system of claim 35, where the processor is further programmed to:
identify a center image of the multiple images; and
use the center image as the reference image.

47. The system of claim 35, where the additional transformations are 2D translation and rotation transformations, and where determining the translation and rotation for one or more of the multiple images includes using two or more points in the determined overlapping regions.

48. The system of claim 35, where the additional transformations are 2D translation, rotation and scaling transformations and where determining the translation, rotation and scaling for one or more images of the multiple images includes using two or more points in the determined overlapping regions.

49. The system of claim 35, where the type of additional transformations is user specified.

50. The system of claim 35, where identifying the reference image comprises identifying an image corresponding to the common reference frame.

51. The system of claim 35, where the processor is further programmed to:
display a composite layout for the multiple images after applying the additional transformations.

* * * * *